United States Patent [19]

Hara et al.

[11] Patent Number: 4,804,593
[45] Date of Patent: Feb. 14, 1989

[54] ENCLOSED CELL HAVING SAFETY VALVE MECHANISM AND FABRICATING METHOD OF THE SAME

[75] Inventors: Mitsunori Hara; Nobuhiro Nagao; Tooru Amazutsumi; Kanji Urushihara, all of Hyogo, Japan

[73] Assignee: Sanyo Electric Co., Ltd., Osaka, Japan

[21] Appl. No.: 51,348

[22] Filed: May 19, 1987

[30] Foreign Application Priority Data

May 20, 1986 [JP] Japan .............................. 61-115053
Sep. 18, 1986 [JP] Japan .......................... 61-142910[U]
Mar. 5, 1987 [JP] Japan ............................ 62-32456[U]

[51] Int. Cl.$^4$ .................. H01M 2/08; H07M 2/02
[52] U.S. Cl. ................................ 429/174; 429/181; 429/184
[58] Field of Search ......... 429/181, 184, 179, 171–174

[56] References Cited

U.S. PATENT DOCUMENTS

| | | | |
|---|---|---|---|
| 3,340,099 | 9/1967 | Sherfey | 429/184 |
| 3,963,521 | 6/1976 | Jache | 429/160 |
| 4,107,403 | 8/1978 | Takamura et al. | 429/174 |
| 4,559,283 | 12/1985 | Kruger et al. | 429/181 X |
| 4,629,665 | 0/0000 | Matsuo | 429/164 |

FOREIGN PATENT DOCUMENTS 60-22753 2/1985 Japan .

Primary Examiner—Stephen J. Kalafut
Attorney, Agent, or Firm—Armstrong, Nikaido, Marmelstein & Kubovcik

[57] ABSTRACT

The present invention relates an enclosed cell and fabricating methods of the cell which has a safety valve mechanism for releasing gas from inside the cell when an internal pressure of the cell rises to an excessive degree. The characterizing feature of the invention resides in the use of a resin packing as sealing element, junctions between the resin packing and a metal lid and between the resin packing and a polar terminal being closed tight by thermal fusion. This construction assures reliable sealing in normal state, and permits the packing to break with an excessive rise in the internal pressure thereby to release gas from inside the cell. The cell of this invention is readily fabricated by injection molding or by a hot press process. Therefore, the enclosed cell according to this invention is fabricated very rationally and inexpensively, assures excellent sealing and safety, and has wide application.

12 Claims, 5 Drawing Sheets

ENCLOSED CELL HAVING SAFETY VALVE MECHANISM AND FABRICATING METHOD OF THE SAME

BACKGROUND OF THE INVENTION (1) Field of the Invention

The present invention relates to an enclosed cell such as an alkaline storage battery or a lithium battery having a safety valve mechanism and methods of fabricating the same. The safety valve mechanism is operable to release gas from inside the cell when an internal pressure of the cell rises to an excessive degree.

(2) Description of the Prior Art

With an enclosed cell such as an alkaline battery or a lithium battery, it is generally an important matter from the safety point of view that its opening is sealed tightly. An insufficient sealing results in liquid leakage. In the case of a lithium cell in particular, the insufficient sealing leads to a further problem of deterioration in cell performance. This arises from the reaction of the lithium anode with the moisture in ambient air entering the cell. The reaction produces a passivation film on the lithium cathode surface which increases the internal resistance of the cell.

Various cells have heretofore been proposed with a view to improvement in sealing reliability.

FIG. 1 of the accompanying drawings illustrates one such example of enclosed cell, wherein the improvement resides in a hermetic seal structure comprising a glass or ceramic insulator a. More particularly, this enclosed cell comprises an outer canister b acting as one of the polar terminals, a metal lid c fused to the outer canister b such as by laser welding, and a cylindrical pin d inserted into and fixed to the insulator a to act as the other polar terminal. The outer canister b includses a thin wall portion e which breaks when the internal resistance of the cell rises as a result of misuse or in an abnormal environment. The internal pressure is released to the ambient surroundings through the breakage, thereby to prevent the cell from bursting.

However, this hermetic seal structure generally is costly because the insulator a is formed of glass or ceramics. It is also difficult to control the thickness t of the thin wall portion e. This impedes valve operating pressure setting, which is contrary to full assurance of safety.

FIG. 2 illustrates a second example of an enclosed cell so far proposed. To improve the sealing this cell discards the hermetic seal structure which is costly and involves difficulties from the point of view of manufacturing technique, in favor of using an insulating packing f formed of a resin (see the Japanese utility model application laid open under No. 60-22753). In this enclosed cell, a second terminal d having a T-shape section is inserted into the packing f and calked by means of a metal washer g fitted on a lower position of the terminal d. This example includes a metal lid c secured to an outer canister b by laser welding or the like as in the first known example. The resin packing f melts and forms an opening (not shown) when the internal pressure of the cell increases or the cell temperature rises to an excessive degree. The gas in the cell is released to the ambient surroundings through this opening, thereby to check the internal pressure increasing and prevent the cell from bursting.

In this enclosed cell, however, the washer g has an outside diameter g greater than the diameter i of a bore defined in the metal lid c, and the bore may be closed by the washer g when the terminal d moves in a direction of arrow j with a rise in the internal pressure of the cell. Thus, the washer g may obstruct the release of the gas from inside the cell. This cell fails to assure safety when used in a severe environment, for example at high temperature.

SUMMARY OF THE INVENTION

A primary object of the present invention is to provide an enclosed cell assuring a high degree of safety, with a reliable sealing, simple in construction, and including a safety valve mechanism having excellent operability.

In order to achieve the above object, an enclosed cell having a safety valve mechanism according to the present invention comprises a generator including an electrode assembly and an electrolyte, an outer canister acting as a first polar terminal, a metal lid fused to the outer canister, a resin packing having polar groups and placed at an opening (including a through bore) defined in the metal lid, and a second polar terminal inserted into the packing, wherein the packing defines seals by thermal fusion thereof to the metal lid and the second polar terminal, respectively.

According to the above construction, the resin packing adheres to the metal elements with a great adhesive strength after the packing is thermally fused thereto in proper conditions, which maintains a reliable sealing at normal times. This resin packing deforms or breaks to release gas from inside the cell on a short-circuit or other abnormal occasion when the cell becomes heated or its internal pressure rises to an excess. In other words, the resin packing acts as the safety valve mechanism and, as noted above, deforms or breaks to outwardly release gas from inside the cell when the internal pressure of the cell exceeds a predetermined value.

This effect is promoted where the through bore is formed in the metal lid to be continuous with at least one cutout. The cutout renders the metal lid readily deformable in regions thereof adjacent the through bore as a result of an excessive pressure rise inside the cell. This permits the safety valve operating pressure to be controlled with ease, thereby improving the safety aspect more.

In view of the sealing performance and other requirements, the packing material is selected from resins having polar groups, such as polyamide 11, polyamide 12, modified polypropylene and modified polyethylene.

Another object of the invention is to provide methods of rationally fabricating an enclosed cell having a safety valve mechanism having an excellent operability as noted above.

Accordingly, a method of fabricating an enclosed cell having a safety valve mechanism according to the invention comprises the steps of placing a metal lid, which is to be fused to an outer canister, and a polar terminal in a space surrounded by a first die and a second die, heating the first and second dies to a temperature below a resin melting point, injecting molten resin into the space, and allowing the molten resin to harden into a resin packing and at the same to be thermally fused to the metal lid and the polar terminal.

In the above fabricating method, the packing is formed by injecting molding with the metal lid and polar terminal placed in a space surrounded by a first and a second dies. This permits the packing formation and thermal fusion to be carried out simultaneously, which leads to a simplified fabricating process and to low manufacturing cost.

The enclosed cell may be fabricated by other methods according to the present invention. One of them comprises the steps of setting the metal lid, resin packing and polar terminal in position in the space surrounded by the first and second dies, and heating and pressurizing the metal lid and polar terminal to thermally fuse the resin packing to the metal lid and polar terminal. Another method comprises the steps of injecting the resin packing onto the metal lid first, then attaching the polar terminal to the resin packing, and thermally fusing the resin packing on the polar terminal.

The safety valve operating pressure may be set to various values by changingthe resin packing thickness, its area subjected to the pressure, and the kind, grade and the like of resin material for forming the packing. The safety valve operating pressure is also adjustable by increasing or decreasing the width, length and number of cutouts formed continuous with the through bore of the metal lid. Particularly the dimensions of the cutouts may readily be adjusted in the manufacturing process, which has the advantage of varying the valve operating pressure with ease.

The enclosed cell constructed as above assures a high degree of safety and has excellent operational response since the cell is sealed reliably and its safety valve mechanism is properly operable under severe conditions. Moreover, this cell has a simple and inexpensive construction and hence an immense practical utility. The cell fabricating methods are highly rationalized for low cost production.

BRIEF DESCRIPTION OF THE DRAWINGS

These and other objects or features of the present invention will become apparent from the following description of preferred embodiments thereof taken in conjunction with the accompanying drawings, in which.

DETAILED DESCRIPTION OF THE PREFERRED EMBODIMENTS

In the following description, like parts are designated by like reference numbers throughout the several drawings.

Figure 3:
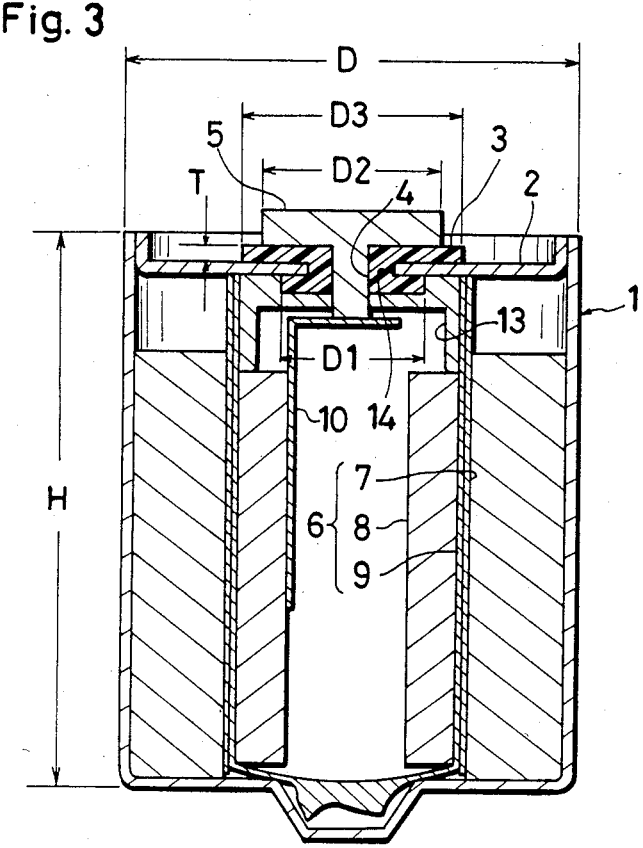
FIG. 3 is a sectional view of an enclosed cell having a safety valve mechanism according to a first embodiment of the present invention.

FIG. 3 is a sectional view of a manganese dioxide-lithium battery which is one example of enclosed cell according to the present invention. This battery comprises an outer canister 1 acting as a positive terminal, a metal lid 2 approximately of a dish shape fused over an entire circumference to the outer canister 1 by laser welding or the like and defining a through bore 14 centrally thereof, an insulating packing 3 formed of a resin having polar groups such as modified polypropylene or polyamide 11, polyamide 12 or the like for adhering the metal lid 2, a negative terminal 5 having a substantially T-shaped section and extending through a center bore 4 of the packing 3, and an electrode assembly 6.

The electrode assembly 6 includes a cathode 7 having manganese dioxide as its active material, a cathode 8 having lithium as its active material, and a bag-like separator 9 interposed between the anode and cathode 7, 8. The electrode assembly, together with an unillustrated electrolyte, constitutes generating elements. The anode 7 is electrically connected to the outer canister 1 under a certain contact pressure, while the cathode 8 is electrically connected to the negative terminal 5 through a negative polar tab 10. Number 13 indicates an insulating sleeve for preventing short-circuit of the electrodes in the battery.

In order to provide excellent sealing, this enclosed cell has rigid junctions achieved by thermal fusion between the metal lid 2 and insulating packing 3 and between the insulating packing 3 and negative terminal 5, respectively.

Figure 4:
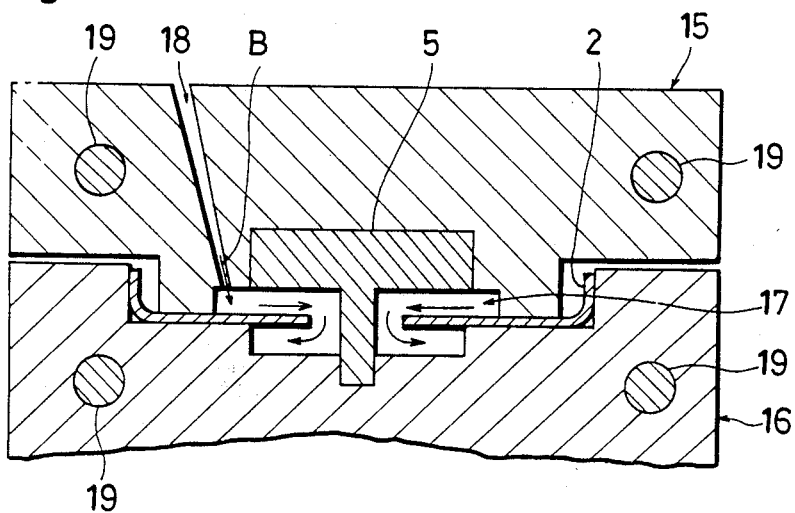
FIG. 4 is an explanatory view illustrating a fabricating process of a safety valve system for the cell shown in FIG. 3.

FIG. 4 illustrates a process of injection molding which is one example of means for thermally fusing these junctions. Number 15 indicates an upper die and number 16 indicates a lower die. Polyamide 12 which has a particularly good adhesive property with respect to metals is employed for forming the insulating packing 3. In this drawing, the metal lid 2 and negative terminal 5 are first placed in a space 17 between the upper and lower dies 15, 16, and then polyamide 12 melted at 230° C. is injected under a pressure of about 300kg/cm² into an injecting bore 18 defined in the upper die 15 as shown by arrows B. The injected polyamide 12 fills the space 17 and forms a resin packing. In the course of hardening in this process, the molten polyamide 12 adheres tight to the metal elements, namely the metal lid 2 and negative terminal 5, and becomes fused thereto. This process of fusing the packing to the metal lid 2 and negative terminal 5 simultaneously with the packing formation, improves productivity and lowers manufacturing cost. Number 19 indicates heaters embedded in the dies 15, 16. These heaters 19 heat the dies 15, 16 which in turn heat the space 17, negative terminal 5 and metal lid 2 to a predetermined temperature.

Figure 1:
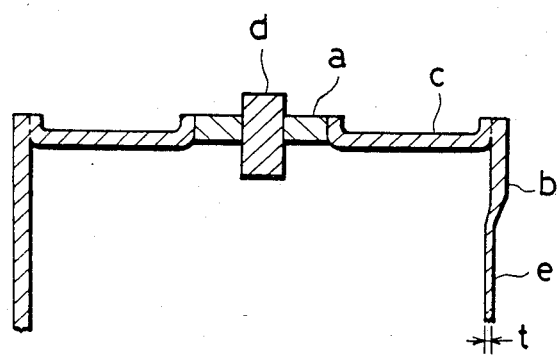
FIG. 1 is a sectional view of a sealing portion of a first example A of known enclosed cell.

Table 1 shows the results of a safety valve operating pressure test conducted on the first and second known enclosed cells noted hereinbefore and the cell according to the present invention (first embodiment) fabricated by the above thermal fusion process. Each cell has the outer canister and metal lid formed of a stainless steel sheet having a 0.3 mm thickness. The thin wall portion e of the first known cell (shown in FIG. 1) was formed into a 0.1 mm thickness t. The valve operating pressures were measured by sealing the cells with the generating elements excluded from the cells. The cells were internally pressurized from atmospheric pressure up to 100kg/cm² at the rate of 2kg/cm² per second. The test was conducted at 110° C. atmospheric temperature and by using 10 samples for each type of cell.

TABLE 1

| operating pressures | 20–30 kg/cm² | 30–40 kg/cm² | 40–50 kg/cm² | over 50 kg/cm² |
| --- | --- | --- | --- | --- |
| 1st embod. of invention | 9 | 1 | — | — |
| 1st known cell | — | — | 1 | 7 |
| 2nd known cell | 5 | 3 | 2 | |

The two remaining samples of the first known cell broke at the laser welded position under the pressure of about 70kg/cm².

Table 2 shows the result of a similar test in which the cells were internally pressurized at the rate of 20kg/cm² per second. This test was conducted at the same atmospheric temperature and in respect of the same number of samples as in the foregoing test.

TABLE 2

| operating pressures | 20–30 kg/cm² | 30–40 kg/cm² | 40–50 kg/cm² | over 50 kg/cm² |
| --- | --- | --- | --- | --- |
| 1st embod. of invention | 6 | 4 | — | — |
| 1st known cell | — | — | — | 8 |
| 2nd known cell | — | 2 | 3 | 2 |

The two remaining samples of the first known cell burst because of inoperative valves. The three remaining samples of the second known cell broke out at the weld junction between the outer canister and metal lid under the pressure of 70–80kg/cm². In the latter case, the valves operate when the pressure rises to 50kg/cm² but fail to cope with a further release of the internal gas at the higher pressures. As seen from Tables 1 and 2, it has been confirmed through the tests that the enclosed cell according to the present invention has its safety valve mechanism acting to prevent bursting of the cell even under severe conditions as above.

Then the cells were tested by mounting therein the generating elements including the anode 7 and cathode 8. The cell samples were charged with 6 V first, and the safety valve of every sample operated to prevent bursting and other trouble. When the samples were charged with 12 V, however, two samples of the first known cell and three of the second known cell burst though no sample of the cell according to this invention (first embodiment) burst.

A further, heating test was conducted by placing each cell sample 5 cm from an acetylene burner. None of the cell samples according to this invention burst thanks to the safety valve mechanism coming into operation, but two samples of the first known cell and one sample of the second known cell burst.

Table 3 shows the results of a drop test carried out to compare the strengths of the enclosed cell according to this invention (first embodiment) and the first known cell having the hermetic seal which is considered to provide an excellent sealing. Thirty samples were used for each cell, and the number of leaking samples were counted after dropping them. The test was conducted by throwing each sample ten times in a selected direction from a height of 1.5 m to a concrete surface. The hermetic seal had an insulator a (FIG. 1) formed of glass.

TABLE 3

| | number of leaking samples |
| --- | --- |
| cell of invention (first embodiment) | 0 |
| first known cell | 7 |

As seen from Table 3, the first known cell must be handled with care since the insulator such as of glass or ceramics used in hermetic sealing is hard and brittle and therefore vulnerable to impact, whereas the first embodiment of the invention is easy to handle since it is sealed with the resin packing which is strong against impact. On the other hand, a helium leak test showed substantially the same leak value for the two types of cells. Table 4 shows its measurement results.

TABLE 4

| | Value of He leaks (atm · cc/sec) |
| --- | --- |
| cell of invention (first embodiment) | $10^{-9}$ |
| first known cell | $10^{-9}$ |

Thus, the cell according to the first embodiment of the invention and the first known cell are equal with respect to the sealing performance under normal circumstances.

Table 5 shows storage characteristics of the cells. The number of samples used was 100.

TABLE 5

| | initial internal resistance | 80° C., 90% RH (after 30 days) | leaking samples (after 30 days at 80° C.) |
| --- | --- | --- | --- |
| 1st embod. of invention | 8 Ω | 10–15 Ω | 0 |
| 1st known cell | 8 Ω | 9–13 Ω | 4 |
| 2nd known cell | 8 Ω | 10–14 Ω | — |

In the case of enclosed cell, cell performance deteriorates after a long storage time due to the moisture of ambient air entering the cell. As seen from Table 5, the enclosed cell according to this invention retains approximately the same internal resistance after a storage period as the first and second known cells, and remains just as well sealed as the prior art cells. Where lithium is used for the cathode as in this manganese dioxide-lithium battery, lithium ions in the cell react with silicone dioxide constituting the principal component of glass, thereby to promote disintegration of the glass. This is responsible for the four leaking samples of the first known samples. In contrast, the packing material used in the first embodiment of the invention does not react with lithium ions, and therefore no leakage takes place.

The cell according to the first embodiment is well sealed as described above and can dispense with the washer mounted in the second known cell (FIG. 2), which means a reduction in the number of components. With the removal of the washer, a special safety valve structure is no longer required since the negative terminal will disengage from the cell by the gas pressure when, for example, the internal resistance of the cell rises under abnormal circumstances. Consequently, the invention has realized a cell having a simple construction and a high degree of safety.

Figure 5:
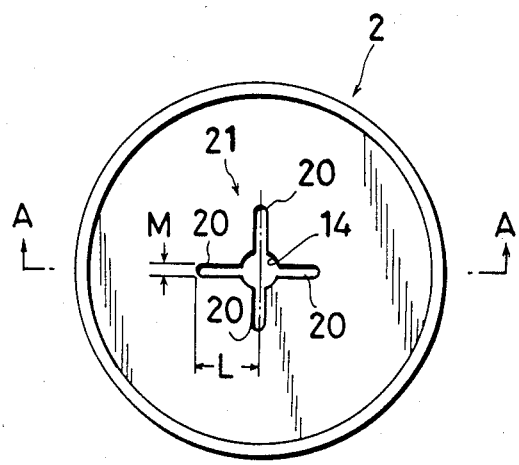
FIG. 5 is a plan view of a metal lid according to a second embodiment of the invention.
Figure 6:
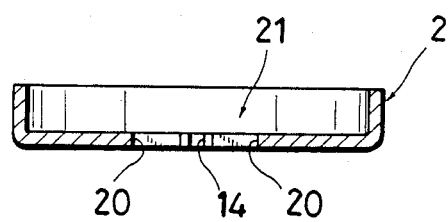
FIG. 6 is a section on line A—A of FIG. 5.

FIGS. 5 and 6 illustrate a second embodiment of the invention which includes an improved metal lid 2. This lid 2 has a dish-like shape and perforated with a center through bore 14 which is continuous with four cutouts 20 to define a cruciform bore 21 (opening) in plan view.

A safety valve mechanism operating test was carried out on a cell having this improved metal lid 2. In this test the cell having the metal lid 2 in the first embodiment was used for comparison purposes. Both of these cells had a 17 mm outside diameter D and a 33.5 mm height H, and their outer canisters 1 and metal lids 2 were formed of a 0.3 mm stainless steel sheet (see FIG. 3). The through bore 14 in the lid of the first embodiment had a 3.5 mm diameter and that in the lid of the second embodiment had a 2.3 mm diameter, and each of the four cutouts 20 in the second embodiment had a 1.8 mm length L and a 0.5 mm width M (see FIG. 5). Table 6 shows the results of this test, i.e. valve operating pressure measurements. In the test, the valve operating pressure was measured at room temperature and at 100° C., using cells of 1800 mAh nominal capacity charged in a constant temperature oven with 6 V constant voltage. The cells used were those having the same storage characteristics.

TABLE 6

|  | room temp. | 100° C. |
|---|---|---|
| 2nd embod. | 50 kg/cm² | 30 kg/cm² |
| 1st embod. | 120 kg/cm² | 55 kg/cm² |

It will be understood from these results that, although the second embodiment has the same sealability as the first embodiment, the second embodiment is resonsive to a very low valve operating pressure and the valve operating pressure therefor has a small range of variation with relation to temperature variations.

Table 7 shows response time of the cells with the valve operating pressure raised to 30–40kg/cm², that is the time taken from the point of time at which the pressure reaches the set value till the point of time at which the resin breaks and a valve operation takes place. The numbers of samples are 78 for the second embodiment and 284 for the first embodiment.

TABLE 7

|  | response time (sec.) |
|---|---|
| 2nd embod. | 48–97 |
| 1st embod. | 109–314 |

These results prove that the second embodiment has high valve operating precision with a short response time, i.e. excellent response, and a small response time distribution.

Figure 2:
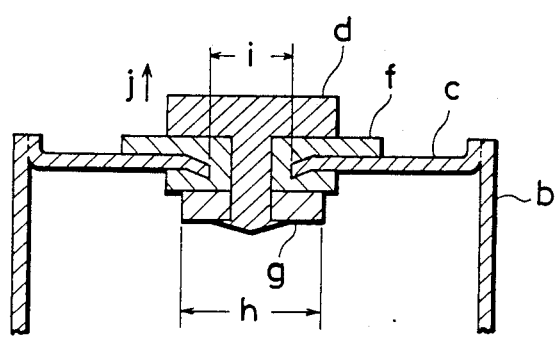
FIG. 2 is a sectional view of a sealing portion of a second example of A known enclosed cell.
Figure 7:
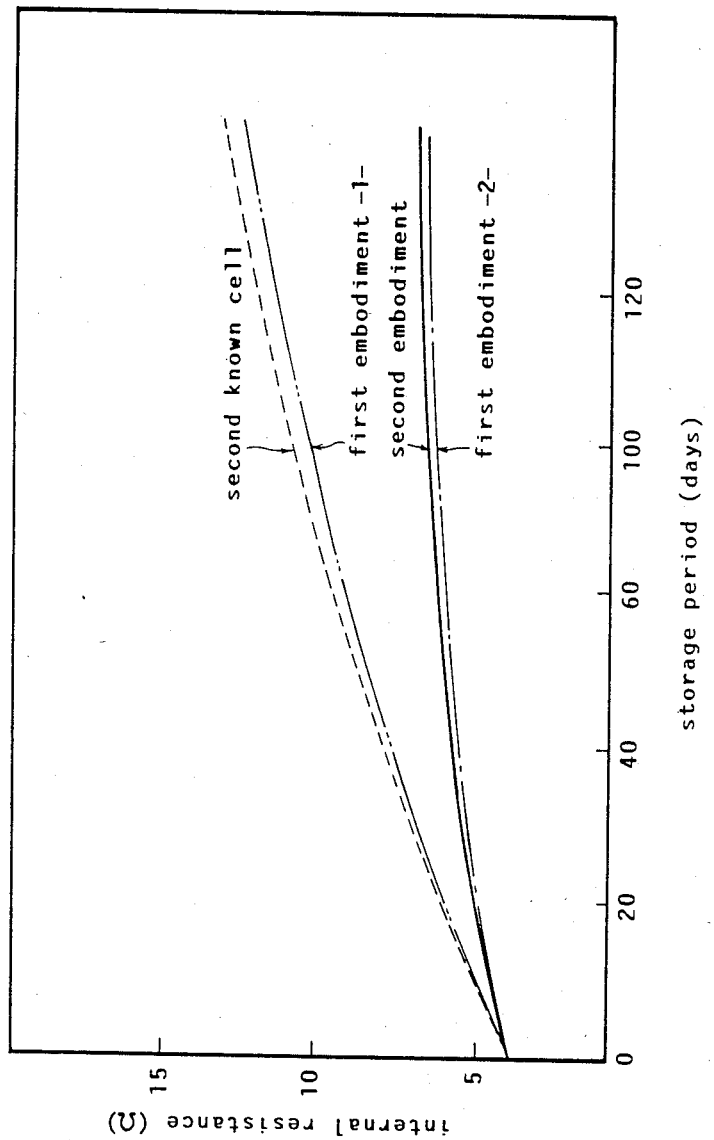
FIG. 7 is a view showing storage characteristics of the enclosed cell according to the present invention.

Next, the internal resistance of these cells was measured by 1 KHz alternating current process and storage characteristics were compared. FIG. 7 is a graph showing the results in comparison with the characteristics of the second known cell (FIG. 2). In this drawing, the solid line represents the cell according to the second embodiment having a 2.3 mm through bore diameter, a 1.8 mm cutout length L and a 0.5 mm cutout width M (FIG. 5), the two-dot and dash line represents a cell according to the first embodiment (1) having a 3.5 mm through bore diameter, the dot and dash line represents a cell according to the first embodiment (2) having a 2.3 mm through bore diameter, and the broken line represents the second known cell shown in Table 5. The test was conducted at an atmospheric temperature of 60° C.

and a humidity of 90%. The test results prove that the second embodiment, while having the same valve operating pressure, 30–40kg/cm², as the first embodiment (1), is effective with respect to the cell sealing in that it restrains the internal resistance rise by means of the opening of the metal lid which has a substantially diminished size for defining the cutouts. On the other hand, the first embodiment (2) having the same through bore in diameter size as the second embodiment is comparable with the latter with respect to the cell sealing. However, the second embodiment which includes the cutouts may be set to a lower valve operating pressure, and therefore may readily be provided with a desired safety valve mechanism. Thus, it has been confirmed that in any case the enclosed cells according to the present invention have a safety valve mechanism of better characteristics than that of the known enclosed cells.

Furthermore, it has been confirmed through a test conducted by applicants that the operating pressure for the safety valve mechanism of this invention is, as distinct from the prior art, variable by changing the adhesion thickness of the resin packing 3 with respect to the metal elements, i.e. metal lid 2 and negative terminal 5. Tables 8 and 9 show operating pressure characteristics obtained by changing the adhesion thickness T in FIG. 3 to 0.1 mm, 0.2 mm, 0.3 mm and 0.4 mm. In FIG. 3, dimension D1 is 4 mm, D2 is 7 mm, and D3 is 9 mm. The test of Table 8 used polyamide 12 as the packing material and the test of Table 9 used modified polypropylene.

TABLE 8

| thickness T (mm) | 0.1 | 0.2 | 0.3 | 0.4 |
|---|---|---|---|---|
| operating pressure (kg/cm²) | 114–138 | 84–124 | 54–98 | 45–61 |

TABLE 9

| thickness T (mm) | 0.1 | 0.2 | 0.3 | 0.4 |
|---|---|---|---|---|
| operating pressure (kg/cm²) | 91–110 | 67–99 | 43–78 | 36–49 |

As seen from Table 8 and 9, the packing 3 having the adhesive thickness T of about 0.4 mm results in a low operating pressure, enabling an appropriate pressure setting. In the case of modified polypropylene, which has a low material strength and a low adhesive strength than polyamide 12, further lowers the valve operating pressure by about 20% and hence provides for a safety valve of the cell having satisfactory functions.

While the second embodiment is provided with the cruciform bore 21 (opening), it has been confirmed that the bore 21 including additional cutouts 20 stabilizes the operating pressure even further. Table 10 shows a comparison in the valve operating pressure between the cruciform bore 21 (opening) and a bore (opening) having a shape of *.

TABLE 10

| bore shape | cruciform | * |
|---|---|---|
| operating pressure (kg/cm²) | 28–39 | 25–31 |

It will be understood from the above data that the bore (opening) having the * shape results in a reduced dispersion of operating pressures and a further improved safety valve of the cell.

Figure 8:
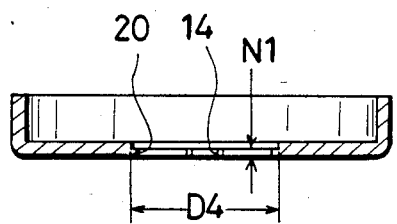
FIG. 8 is a sectional view of a metal lid according to a further embodiment of the invention.

The valve operating pressure may also be lowered for practical purposes by forming the metal lid 2 to be partially thin as shown in FIG. 8. More particularly, the metal lid 2 of FIG. 8 includes thin wall portions defining a circle of 9 mm diameter D4 concentric with the cruciform bore 21 (opening). These thin wall portions have a 0.1 mm wall thickness N1 (the remaining portion being 0.3 mm thick as in the first and second embodiments). This construction is effective to stabilize the valve operating pressure to 28–36kg/cm$^2$, which contributes toward improved quality.

The present invention is not limited to the described embodiments. The foregoing embodiments employ the thermal fusion method for forming the packing by injection molding and for fusing the packing to the negative terminal and metal lid at the same time. Instead of this process, the packing may be manufactured beforehand, set in the space between the dies together with the metal lid and negative terminal, and then heated and pressurized by suitable means to effect the thermal fusion. This has the advantage of permitting a general purpose packing ot be used as it is for the cell. As another fabricating process, a packing is insert molded in the metal lid, then the negative terminal is inserted into the packing, and finally the metal lid and negative terminal are heated and pressurized by the hot press method or the like thereby to bond with each other. These processes, however, require a vacuum drying step since the resin packing has a water absorption of about 1.5%. Generally, a metal surface has "O" and "OH" bonded thereto, and H$_2$O is hydrogen-bonded to the "O" and "OH". The resin forming the packing also is hydrogen-bonded to these elements. Since the hydrogen-bonding is weaker than the bonding of "O" and "OH" on the metal surface, the H$_2$O present between the metal surface and the resin having polar groups would impair good adhesion. It is therefore necessary to dehydrate the packing. Thus, the resin packing is dehydrated by vacuum drying it under a reduced pressure of 4 mmHg and at 120° C. for about two hours, for example. Then the negative terminal is inserted into the packing in dry atmosphere, which is followed by a hot press heating step for heating the metal lid and polar terminal at 200° C. for two seconds, for example.

A packing material having no polar group cannot be used for lack of the adhesive property with respect to metals, but any resin may be used only if it has polar groups. However, it is desirable to use modified polypropylene or polyamide 12 or polyamide 11 as described with the foregoing embodiments. As is well known, polyamide 12 and polyamide 11 have the excellent rate proof water penetration, and are well suited where tight contact and high sealing performance are required of the packing. Modified polypropylene is suitable for setting the valve operating pressure low.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An enclosed cell having a safety valve mechanism, comprising:
   an outer can having an opening at one end thereof and acting as a first polar terminal,
   a generating element disposed in said outer can and including an electrode assembly and an electrolyte,
   a metal lid fused to a peripheral edge of the opening of said outer can containing said generating element, said metal lid defining a through bore centrally thereof and at least one cutout continuous with said through bore,
   a second polar terminal including a planar portion and a pin component extending from a center of an undersurface of said planar portion, said pin component extending into said through bore without contacting said through bore, and
   a resin packing having polar groups and being placed between said metal lid and said second polar terminal for sealing a cell interior gastight,
   wherein said packing defines seals by thermal fusion thereof to said metal lid and to a peripheral face of said pin component, said packing being deformable and/or breakable to release a gas when an internal pressure of the cell increases to excess.

2. An enclosed cell as claimed in claim 1, wherein said metal lid is comparatively thin adjacent to said through bore and said cutout.

3. An enclosed cell as claimed in claim 1, wherein said resin packing comprises a material selected from the group consisting of polyamide 11, polyamide 12, modified polypropylene, and modified polyethylene.

4. An enclosed cell as claimed in claim 1, further comprising a positive electrode formed of manganese dioxide, and a negative electrode formed of lithium.

5. An enclosed cell as claimed in claim 1, wherein said second polar terminal has a T-shaped section with said pin component being smaller in diameter than said through bore and extending from the center of the undersurface of said planar portion which is larger in diameter than said through bore.

6. An enclosed cell having a safety valve mechanism, comprising:
   an outer can having an opening at one end therof and acting as a first polar terminal,
   a generating element disposed in said outer can and including an electrode assembly and an electrolyte,
   a metal lid fused to a peripheral edge of the opening of said outer can containing said generating element, said metal lid defining a through bore centrally thereof and being comparatively thin adjacent to said through bore,
   a second polar terminal including a planar portion and a pin component extending from a center of an undersurface of said planar portion, said pin component extending into said through bore without contacting said through bore, and
   a resin packing having polar groups and being placed between said metal lid and said second polar terminal for sealing a cell interior gastight,
   wherein said packing defines seals by thermal fusion thereof to said metal lid and to a peripheral face of said pin component, said packing being deformable and/or breakable to release a gas when an internal pressure of the cell increase to excess.

7. An enclosed cell as claimed in claim 6, wherein said metal lid defines at least one cutout adjacent to said through bore.

8. An enclosed cell as claimed in claim 6, wherein said resin packing comprises a material selected from the group consisting of polyamide 11, polyamide 12, modified polypropylene, and modified polyethylene.

9. An enclosed cell as claimed in claim 6, further comprising a positive electrode formed of manganese dioxide, and a negative electrode formed of lithium.

10. An enclosed cell as claimed in claim 6, wherein said second polar terminal has a T-shaped section with said pin component being smaller in diameter then said through bore and extending from the center of the undersurface of said planar portion which is larger in diameter than said through bore.

11. An enclosed cell as claimed in claim 2, wherein the comparatively thin portion of said metal lid has a thickness of about 0.1 mm.

12. An enclosed cell as claimed in claim 6, wherein the comparatively thin portion of said metal lid has a thickness of about 0.1 mm.

* * * * *